Feb. 2, 1926.
S. H. McCOWAN
1,571,853
CLAMPING DEVICE
Filed April 11, 1925
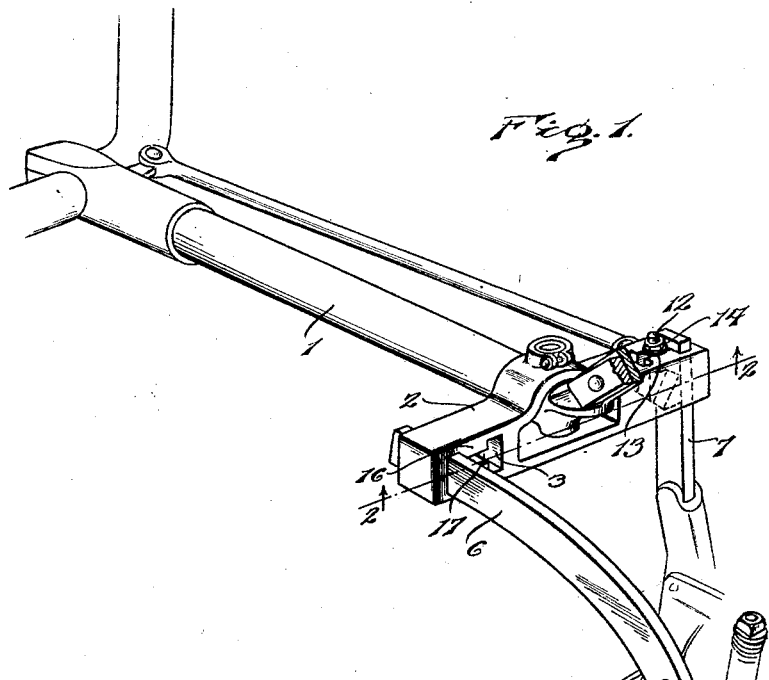
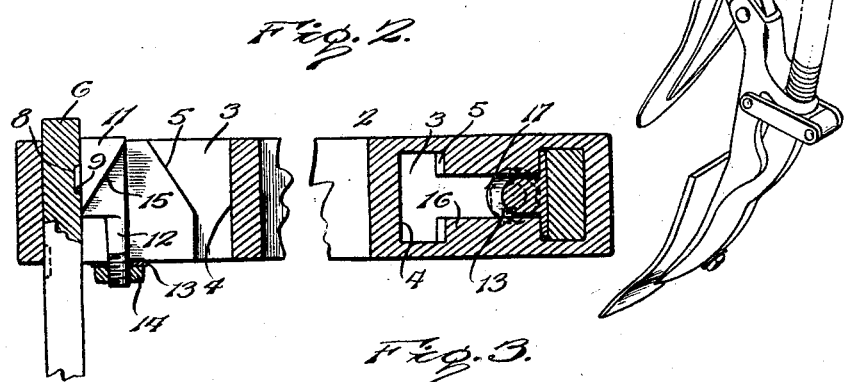
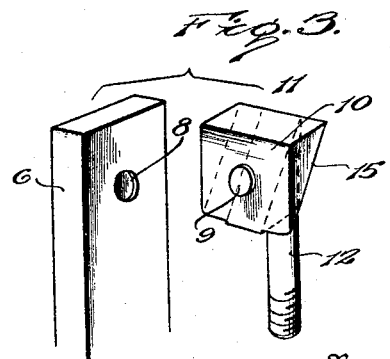
Inventor
S. H. McCowan
By Lacey & Lacey, Attorneys Patented Feb. 2, 1926.

1,571,853

UNITED STATES PATENT OFFICE.

SAMUEL H. McCOWAN, OF GREENWAY, ARKANSAS.

CLAMPING DEVICE.

Application filed April 11, 1925. Serial No. 22,315.

*To all whom it may concern:*

Be it known that I, SAMUEL H. McCOWAN, a citizen of the United States, residing at Greenway, in the county of Clay and State of Arkansas, have invented certain new and useful Improvements in Clamping Devices, of which the following is a specification.

This invention relates to clamping devices and is intended more particularly for securing the shank or beam of a cultivator shovel in the crosshead carried by the cultivator beam. The object of the invention is to provide a very simple, inexpensive and secure fastening which will minimize the strain upon the bolt and nut and will be so formed that the thrust or pull upon the cultivator shovels and their shanks or beams will serve to make the fastening more secure. The invention is illustrated in the accompanying drawing and will be hereinafter fully set forth.

In the drawing:

Figure 1 is a perspective view of a portion of a cultivator having my invention embodied therein;

Fig. 2 is a horizontal section through the crosshead, and

Fig. 3 is a detail view of an end of the cultivator shank or beam and of the clamping bolt.

The cultivator beam 1 may be of any well-known type and the crosshead 2 is secured to the rear end of the beam in the usual manner. It has heretofore been proposed to construct the crosshead with openings 3 through their end portions, which openings have one vertical flat longitudinal wall 4 and also have an opposed wall presenting an obliquely disposed portion 5. The obliquely disposed portion 5 may extend from top to bottom of the crosshead or from front to rear thereof so that the crosshead is adapted to receive a horizontally extending shovel, beam or shank, as shown at 6, or a vertical shank, as indicated at 7. In carrying out my present invention, the shank 6 or 7, as the case may be, is provided in its lateral face with one or more recesses or seats 8 which may be engaged by a teat 9 on the flat face 10 of the enlarged head 11 of the securing bolt. The bolt has a shank 12 which is adapted to extend through the opening 3 in the crosshead and receive a washer 13 and a nut 14 upon its rear end which serve to cooperate with the rear side of the crosshead to clamp the bolt or key in place. The threaded shank 12 of the bolt or key is obviously of less diameter than the head 11 so that it will be spaced from the shank or beam 6 a sufficient distance to accommodate the nut and washer. The head is provided with the obliquely disposed faces 15 adapted to engage against the obliquely disposed walls 5 of the opening 3 so that, when the nut is turned home, a wedging binding action between the bolt and the wall of the opening will be effected.

The seats or recesses 8 are provided in both side faces of the shank or beam 6 so that the shank or beam may be disposed against either flat end wall 4 of the opening, it being noted that the inclined walls 5 are formed upon inner projections 16 of the walls of the crosshead and a passage or slot 17 being formed between these projections to accommodate the shank 12 of the key or bolt. The teat 9 on the head of the securing bolt, being engaged in the seat in the side of the shovel, beam, or shank, will effect a positive engagement with the said shank so that relative movement between the shank and the key or bolt will be prevented, and when the key is turned home by manipulation of the nut, the beam will be very securely clamped against the end wall of the opening through the crosshead. The thrust or strain upon the shovel is, of course, carried by the shovel shank or beam and tends to move the beam rearwardly through the crosshead, resulting, in my device, in increasing the binding action between the diagonally disposed faces of the bolt head and the inclined walls of the opening through the crosshead so that the greater the strain upon the cultivator shank the more firmly will it be held. A great difficulty in similar devices heretofore employed has been found to exist in that the nuts had to be turned fully home and the strength of the clamp depended upon the extent to which the nut was driven home. Through continued use, the threads of the nut or the bolt were stripped and the opposed faces of the cultivator shank or beam and the securing bolt worn smooth so that the shank would not be held firmly but would slip and frequently drop from the crosshead. In my device, it is not necessary to turn the nut tightly home and the interlocking engagement between the bolt head and the shank furnished by the teat on the bolt head and the seat in the lateral face of the shank positively and effectually prevent relative slipping movement between these parts. The device is exceedingly simple and inexpensive and may be easily applied to existing cultivators.

Having thus described the invention, I claim:

The combination of a crosshead having an opening therethrough, said opening having a flat end wall and having obliquely disposed walls opposed to said end wall with an open space between said obliquely disposed walls, a shank insertible through the opening in the crosshead to bear against the flat wall of the same and provided in its lateral face with a recess, and a bolt having a shank extending between the obliquely disposed walls of the opening in the crosshead and an enlarged head provided with obliquely disposed faces adapted to engage the obliquely disposed walls and a projection on one side of the head engaging the seat in the lateral face of the shank.

In testimony whereof I affix my signature.

SAM H. McCOWAN. [L. S.]